US012091055B2

(12) United States Patent
Torres et al.

(10) Patent No.: US 12,091,055 B2
(45) Date of Patent: Sep. 17, 2024

(54) TRACKING VANISHED OBJECTS FOR AUTONOMOUS VEHICLES

(71) Applicant: Waymo LLC, Mountain View, CA (US)

(72) Inventors: Luis Torres, San Francisco, CA (US); Brandon Luders, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/123,723

(22) Filed: Mar. 20, 2023

(65) Prior Publication Data

US 2023/0227074 A1 Jul. 20, 2023

Related U.S. Application Data

(63) Continuation of application No. 16/427,610, filed on May 31, 2019, now Pat. No. 11,643,115.

(51) Int. Cl.
*B60W 60/00* (2020.01)
*B60W 50/00* (2006.01)

(52) U.S. Cl.
CPC .. *B60W 60/00272* (2020.02); *B60W 50/0097* (2013.01); *B60W 2400/00* (2013.01); *B60W 2554/402* (2020.02); *B60W 2556/10* (2020.02)

(58) Field of Classification Search
None
See application file for complete search history.

(56) References Cited

U.S. PATENT DOCUMENTS

| 9,335,768 | B2 | 5/2016 | Silver et al. |
| 9,434,382 | B1 | 9/2016 | Prokhorov et al. |
| 9,449,506 | B1 * | 9/2016 | Whiting .................. G06T 7/215 |
| 9,589,595 | B2 * | 3/2017 | Gao .......................... G06T 7/75 |

(Continued)

FOREIGN PATENT DOCUMENTS

| EP | 3477614 A1 | 5/2019 |
| EP | 3480788 A1 | 5/2019 |

(Continued)

OTHER PUBLICATIONS

Office Action for corresponding Chinese Application No. 20208003888.1 dated Jun. 29, 2023 (24 pages).

(Continued)

*Primary Examiner* — Amelia Vorce
(74) *Attorney, Agent, or Firm* — Botos Churchill IP Law

(57) ABSTRACT

Aspects of the disclosure relate to methods for controlling a vehicle having an autonomous driving mode. For instance, sensor data may be received from one or more sensors of the perception system of the vehicle, the sensor data identifying characteristics of an object perceived by the perception system. When it is determined that the object is no longer being perceived by the one or more sensors of the perception system, predicted characteristics for the object may be generated based on one or more of the identified characteristics. The predicted characteristics of the object may be used to control the vehicle in the autonomous driving mode such that the vehicle is able to respond to the object when it is determined that the object is no longer being perceived by the one or more sensors of the perception system.

21 Claims, 8 Drawing Sheets

(56) References Cited

U.S. PATENT DOCUMENTS

| | | | |
|---|---|---|---|
| 9,672,627 B1* | 6/2017 | Ramaswamy | G06T 7/292 |
| 9,805,474 B1* | 10/2017 | Whiting | G06T 7/20 |
| 9,934,689 B2 | 4/2018 | Prokhorov | |
| 10,037,613 B1 | 7/2018 | Becker et al. | |
| 10,255,525 B1 | 4/2019 | Totolos et al. | |
| 10,460,182 B1 | 10/2019 | Park | |
| 11,227,401 B1 | 1/2022 | Mahieu et al. | |
| 11,498,587 B1* | 11/2022 | Mitlin | G05D 1/0212 |
| 2004/0019425 A1 | 1/2004 | Zorka et al. | |
| 2009/0058677 A1 | 3/2009 | Tseng et al. | |
| 2010/0106356 A1 | 4/2010 | Trepagnier et al. | |
| 2012/0316725 A1 | 12/2012 | Trepagnier et al. | |
| 2013/0031045 A1 | 1/2013 | James et al. | |
| 2013/0278769 A1* | 10/2013 | Nix | G08G 1/166 348/148 |
| 2014/0240466 A1* | 8/2014 | Holz | G06T 7/70 348/47 |
| 2015/0123995 A1 | 5/2015 | Zavodny et al. | |
| 2015/0210312 A1* | 7/2015 | Stein | G05D 1/0246 701/41 |
| 2015/0269844 A1 | 9/2015 | Arndt et al. | |
| 2016/0224850 A1 | 8/2016 | Silver et al. | |
| 2017/0329332 A1 | 11/2017 | Pilarski et al. | |
| 2018/0126984 A1 | 5/2018 | Liu et al. | |
| 2018/0174465 A1 | 6/2018 | Ikedo et al. | |
| 2018/0211403 A1 | 7/2018 | Hotson et al. | |
| 2018/0239361 A1 | 8/2018 | Micks et al. | |
| 2018/0341822 A1 | 11/2018 | Hovis et al. | |
| 2019/0025433 A1 | 1/2019 | Yang et al. | |
| 2019/0064815 A1 | 2/2019 | Haynes | |
| 2019/0064840 A1 | 2/2019 | Becker | |
| 2019/0079526 A1 | 3/2019 | Vallespi-Gonzalez et al. | |
| 2019/0154824 A1* | 5/2019 | Bilik | G01S 7/411 |
| 2019/0220989 A1 | 7/2019 | Harmsen et al. | |
| 2019/0236958 A1 | 8/2019 | Fang et al. | |
| 2019/0244368 A1 | 8/2019 | Fang et al. | |
| 2019/0299983 A1 | 10/2019 | Shalev-Shwartz et al. | |
| 2019/0370978 A1 | 12/2019 | Hashimoto et al. | |
| 2019/0378423 A1* | 12/2019 | Bachrach | G06T 19/003 |
| 2020/0126239 A1 | 4/2020 | Qian et al. | |
| 2020/0143177 A1 | 5/2020 | Naser et al. | |
| 2020/0184278 A1 | 6/2020 | Zadeh et al. | |
| 2020/0218910 A1* | 7/2020 | Herman | G06V 20/20 |
| 2020/0225669 A1 | 7/2020 | Silva et al. | |
| 2020/0249674 A1 | 8/2020 | Dally et al. | |
| 2020/0250832 A1* | 8/2020 | Li | G06T 7/246 |
| 2020/0278681 A1 | 9/2020 | Gier et al. | |
| 2020/0327343 A1* | 10/2020 | Lund | H04W 4/46 |
| 2020/0331465 A1* | 10/2020 | Herman | G08G 1/161 |
| 2020/0363815 A1 | 11/2020 | Mousavian et al. | |
| 2021/0110484 A1* | 4/2021 | Shalev-Shwartz | B60W 10/18 |
| 2021/0144340 A1 | 5/2021 | Oami | |
| 2021/0261123 A1* | 8/2021 | Wray | B60W 30/18163 |
| 2022/0004818 A1* | 1/2022 | Koopman | G06V 10/98 |
| 2022/0048500 A1 | 2/2022 | Nguyen Van et al. | |
| 2022/0146276 A1 | 5/2022 | Golinsky et al. | |
| 2023/0077393 A1* | 3/2023 | Lee | B60W 40/02 701/24 |

FOREIGN PATENT DOCUMENTS

| | | |
|---|---|---|
| JP | 2015225615 A | 12/2015 |
| KR | 20190015494 A | 2/2019 |
| WO | 2018003056 A1 | 1/2018 |

OTHER PUBLICATIONS

International Search Report and Written Opinion for Application No. PCT/US2020/035202 dated Sep. 11, 2020.

Li, J, Zhan, W., and Tomizuka, M, Generic Vehicle Tracking Framework Capable of Handling Occlusions Based on Modified Mixture Particle Filter, Sep. 20, 2018.

Notice of Reasons for Rejection for Japanese Patent Application No. 2021-568494, Feb. 7, 2023.

The Extended European Search Report for European Patent Application No. 20815126.6, Jan. 4, 2023.

* cited by examiner

TRACKING VANISHED OBJECTS FOR AUTONOMOUS VEHICLES

CROSS REFERENCE TO RELATED APPLICATIONS

The present application is a continuation of U.S. patent application Ser. No. 16/427,610, filed May 31, 2019, the entire disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where users may provide some initial input, such as a pickup or destination location, and the vehicle maneuvers itself to that location. In order to do so, a perception system of the vehicle, including one or more sensors, may periodically publish sensor data which identifies characteristics of objects perceived by the one or more sensors and sends these characteristics to other systems of the vehicle. For instance, the published characteristics for an object may be used by a behavior prediction system to predict a future behavior of the object (e.g. predicted characteristics and how those characteristics may change over time). Typically, a planner system of the vehicle may use the latest set of published characteristics for perceived objects, output of the behavior prediction system as well as map information to determine a trajectory for the vehicle to follow for some period of time into the future.

BRIEF SUMMARY

One aspect of the disclosure provides a method of controlling a vehicle having an autonomous driving mode. The method includes receiving, by one or more processors, sensor data from one or more sensors of a perception system of the vehicle, the sensor data identifying characteristics of an object perceived by the perception system; determining, by the one or more processors, that the object is no longer being perceived by the one or more sensors of the perception system; generating, by the one or more processors, predicted characteristics for the object based on the determination as well as the one or more of the characteristics; and using, by the one or more processors, the predicted characteristics of the object to control the vehicle in the autonomous driving mode such that the vehicle is able to respond to the object when the object is no longer being perceived by the one or more sensors of the perception system.

In one example, the plurality of conditions further includes that one of the characteristics identifies the object as a road user. In this example, the road user is a pedestrian, bicyclist, or vehicle. In another example, the method also includes determining that one of the characteristics identifies the object as an unknown, moving object, and generating the predicted characteristics is further based on the determination that one of the characteristics identifies the object as an unknown, moving object. In another example, when the object is no longer being perceived by the one or more sensors of the perception system, no characteristics for the object have been received from the perception system for a predetermined period of time. In another example, the method also includes determining that the object is not included in a set of false objects published by the perception system, and generating the predicted characteristics is further based on the determination that the object is not included in a set of false objects. In another example, determining that the object has been identified in at least a minimum number of iterations of the perception system publishing sensor data, and generating the predicted characteristics is further based on the determination. In this example, the method also includes identifying the minimum number of iterations is based on a classification of the characteristics. In another example, the method also includes determining that the object should not be within a field of view of the perception system based on the characteristics, and generating the predicted characteristics is further based on the determination that the object should not be within a field of view of the perception system. In this example, the method also includes determining the field of view based on a range of the sensors and characteristics of perceived objects. In another example, the method also includes determining that the object is within a predetermined distance of an edge of a field of view of the perception system based on the characteristics, and wherein generating the predicted characteristics is further based on the determination that the object is within a predetermined distance of an edge of a field of view of the perception system. In this example, the method also includes determining the field of view based on a range of the sensors and characteristics of perceived objects. In another example, the method also includes receiving a behavior prediction for the object, and wherein generating the predicted characteristics is further based on the behavior prediction. In this example, the method also includes storing the one or more of the characteristics and the behavior prediction in memory for future used based on the determination. In another example, the method also includes using the predicted characteristics to generate a new behavior prediction for the object; generating updated predicted characteristics for the object based the new behavior prediction; and using the updated predicted characteristics of the object to control the vehicle in the autonomous driving mode such that the vehicle is able to respond to the object when the object is no longer being perceived by the one or more sensors of the perception system. In another example, the method also includes determining when the object meets a condition that the object has not been perceived by the one or more sensors of the perception system for a predetermined amount of time, and when the object is determined to meet the condition, no longer using the predicted characteristics of the object to control the vehicle in the autonomous driving mode. In another example, the method also includes determining when the object meets a condition that a predicted location of the object of the predicted characteristics overlaps with a location of an object currently perceived by the one or more sensors of the perception system, and when the object is determined to meet the condition, no longer using the predicted characteristics of the object to control the vehicle in the autonomous driving mode. In another example, the method also includes determining when the object meets a condition that a predicted location of the object of the predicted characteristics is within a predetermined distance of a location of an object currently perceived by the one or more sensors of the perception system and when the object is determined to meet the condition, no longer using the predicted characteristics of the object to control the vehicle in the autonomous driving mode. In this example, the method also includes identifying the predetermined distance based on a speed of the object currently perceived by the perception system. In another example, the method also includes determining when the object meets a condition that a predetermined period of time has passed during which a location of the object of the predicted characteristics corresponds to a location that is perceived by the perception system, and when the object is determined to meet the condition, no longer using the predicted characteristics of the object to control the vehicle in the autonomous driving mode.

DETAILED DESCRIPTION

Overview

Figure 1:
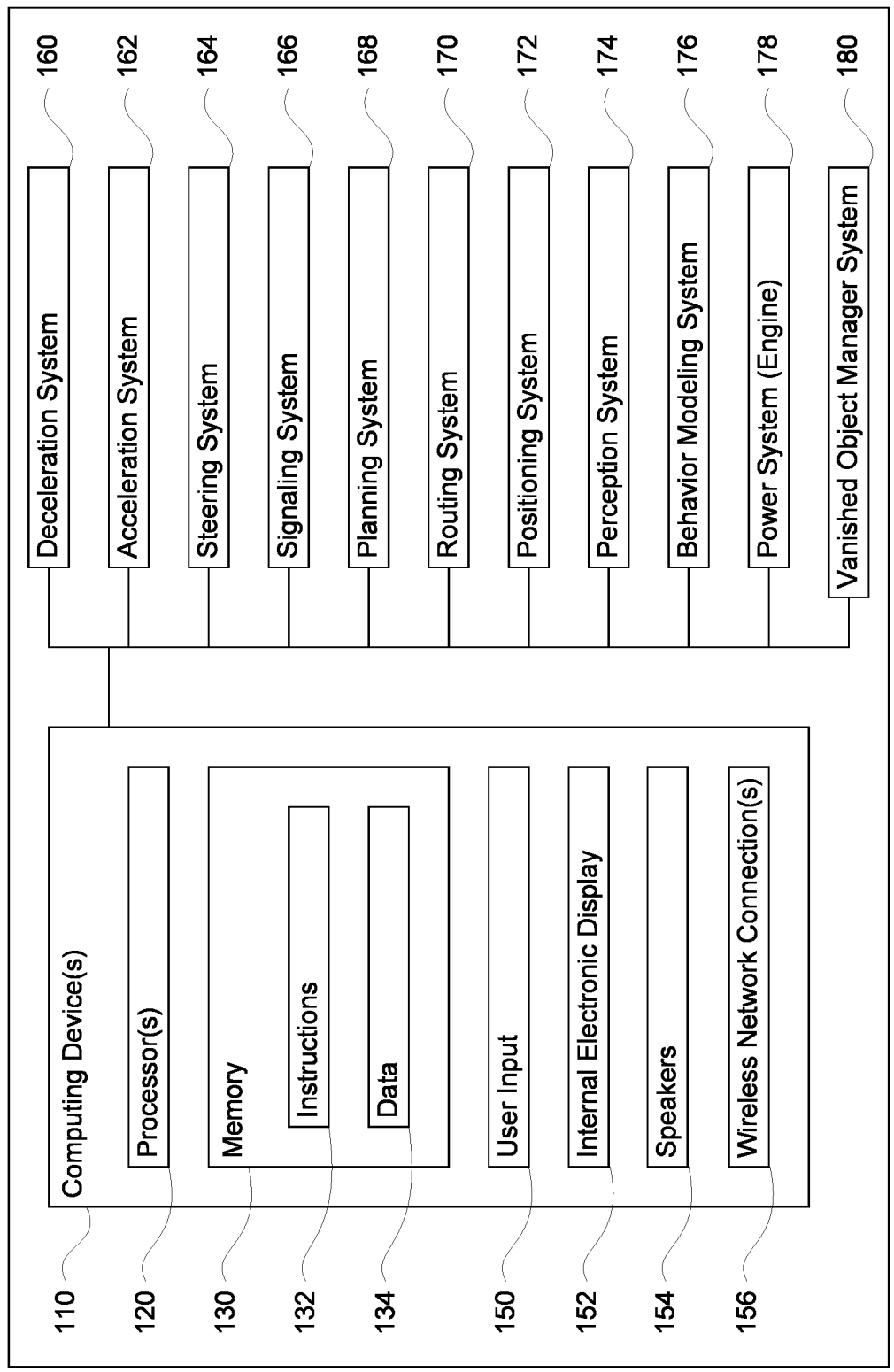
FIG. 1 is a functional diagram of an example vehicle in accordance with an exemplary embodiment.

The technology relates to tracking objects that appear to have vanished or rather, objects that were at one time perceived as objects by one or more sensors of a perception system of an autonomous vehicle and sometime later are no longer perceived as objects by any of the one or more sensors. As noted above, a perception system of the vehicle may publish characteristics of objects perceived by the one or more sensors and sends these characteristics to other systems of the vehicle. The characteristics may include a classification (type), location, speed, heading, orientation, size and shape, etc. For instance, the published characteristics for an object may be used by a behavior prediction system to predict a future behavior of the object (e.g. predicted characteristics and how those characteristics may change over time). Typically, a planner system of the vehicle may use the latest set of published characteristics for perceived objects, output of the behavior prediction system as well as map information to determine a trajectory for the vehicle to follow for some period of time into the future.

Once an object is no longer being perceived by the sensors of the perception system, the object's characteristics are no longer being published and sent to the other systems of the vehicle. As such, without some additional input the planner may no longer able to respond to that object. This can occur for any number of reasons, for instance, if the object becomes occluded by another object (such as a pedestrian walking behind a tree or a vehicle that moves into an area behind another vehicle) or if the object has simply moved out of a field of view of the vehicle's perception system. Because some of these objects may eventually reappear, it may be useful to "remember" or track some of these objects. The features described herein allow the autonomous vehicle's planner system to respond to these remembered objects, or rather, to respond to objects when there are no characteristics for those objects being published by the perception system.

For instance, a vanished object manager system may track objects that appear to have vanished by propagating their most likely location based on the most recent available characteristics. In many cases, when an object vanishes, there may be no need for the vanished object manager system to track those objects, such as where the objects are not actually relevant for planning. Thus, tracking all objects that appear to have vanished may be an inefficient use of resources. In this regard, only certain categories of objects, such as other road users and unknown moving objects, may be remembered.

In order to avoid tracking too many objects, for identified objects in one of the aforementioned categories the vanished object manager system may determine whether the identified object meets a plurality of conditions. In this regard, for each identified object, the vanished object manager system may determine whether the identified object meets the plurality of conditions.

Any objects in one of the categories which also meet the plurality of characteristics may be considered a vanished object and remembered by the vanished object manager system. In this regard, the vanished object manager system may store vanished object data for objects including one or more of the last known characteristics of an object, such as the object's last perceived location, as well as a most likely behavior prediction for the object.

Each time the perception system publishes new characteristics for objects, the vanished object manager system may use the vanished object data for any remembered objects to generate a set of predicted characteristics for the vanished objects. These predicted characteristics may then be input into the planner system in order to be used to generate trajectories. This may enable the vehicle to respond to vanished objects even where they are not perceived by the perception system.

Eventually, it may no longer be necessary or practical to remember certain vanished objects. In this regard, at some point in time, the vanished object data may no longer be stored or used to send predicted characteristics to the planner system. This may be the case when one or more conditions are met.

The features described herein may enable an autonomous vehicle to respond to real objects that may be nearby to the vehicle, but that the vehicle's perception system is not able to perceive. This may also increase safety of the vehicle. Moreover, by remembering only certain categories of objects which meet certain conditions, this may limit the amount of resources required for remembering, for instance if all observed objects which appeared to vanish were remembered.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, power system 178 (i.e. the vehicle's engine or motor) in order to control the movement, speed, etc. of vehicle 100 in accordance with the instructions 132 of memory 130), as well as vanished object manager system. Each of these systems may include various hardware (processors and memory similar to processors 120 and memory 130) as well as software, in order to enable these systems to perform various tasks. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 168 may be used by computing devices 110 in order to determine and follow a route generated by a routing system 170 to a location. For instance, the routing system 170 may use map information to determine a route from a current location of the vehicle to a destination location. The planning system 168 may periodically generate trajectories, or short-term plans for controlling the vehicle for some period of time into the future, in order to follow the route to the destination. In this regard, the planning system 168, routing system 170, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
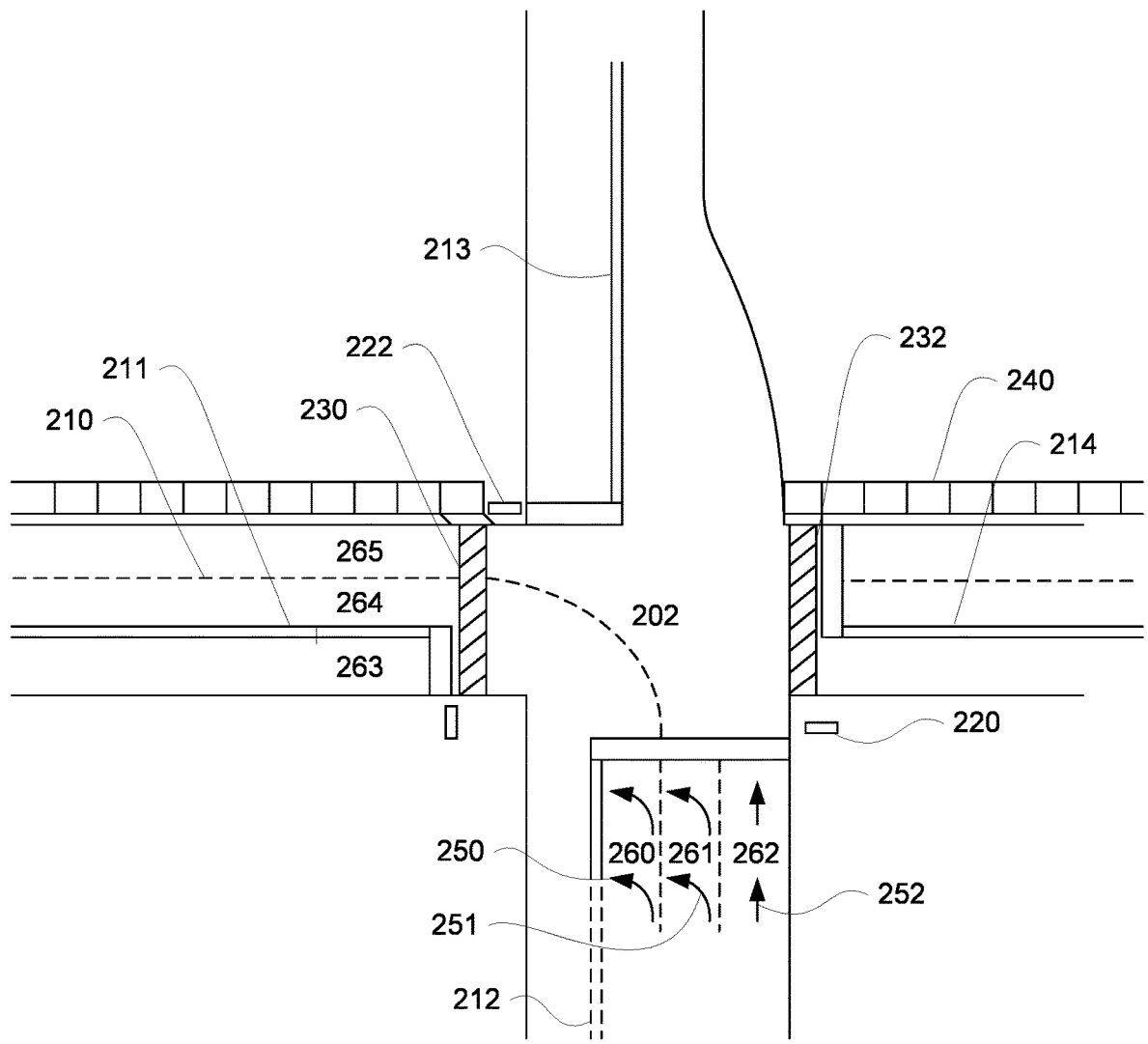
FIG. 2 is an example of map information in accordance with aspects of the disclosure.

FIG. 2 is an example of map information 200 for a section of roadway including an intersection 202. The map information 200 includes information identifying the shape, location, and other characteristics of various features including lane lines 210, 211, 212, 213, 214, traffic control devices 220, 222 (which may include, for example, traffic signal lights, stop signs, etc.), crosswalks 230, 232, sidewalk 240, road markings including arrows 250, 251, 252, as well as features such as lanes 260, 261, 262, 263, 264, 265. Although only a few features are shown and identified, the map information 200 may be highly-detailed and include various additional features.

Although the map information is depicted herein as an image-based map, the map information need not be entirely image based (for example, raster). For example, the map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a road graph to allow for efficient lookup of certain road graph features.

Positioning system 172 may be used by computing devices 110 in order to determine the vehicle's relative or absolute position on a map or on the earth. For example, the position system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 174 also includes one or more components for detecting objects external to the vehicle such as other vehicles, obstacles in the roadway, traffic signals, signs, trees, etc. For instance, the perception system 174 may include one or more sensors including, for example, lasers, sonar, radar, cameras and/or any other detection devices that record data which may be processed by computing devices 110. In this regard, the perception system 174 may have a field of view corresponding to the combined fields of view of the one or more sensors within which the perception system 174 is able to perceive objects. When an object is perceived, the perception system 174 may publish sensor data including a plurality of characteristics for that object.

Figure 3:
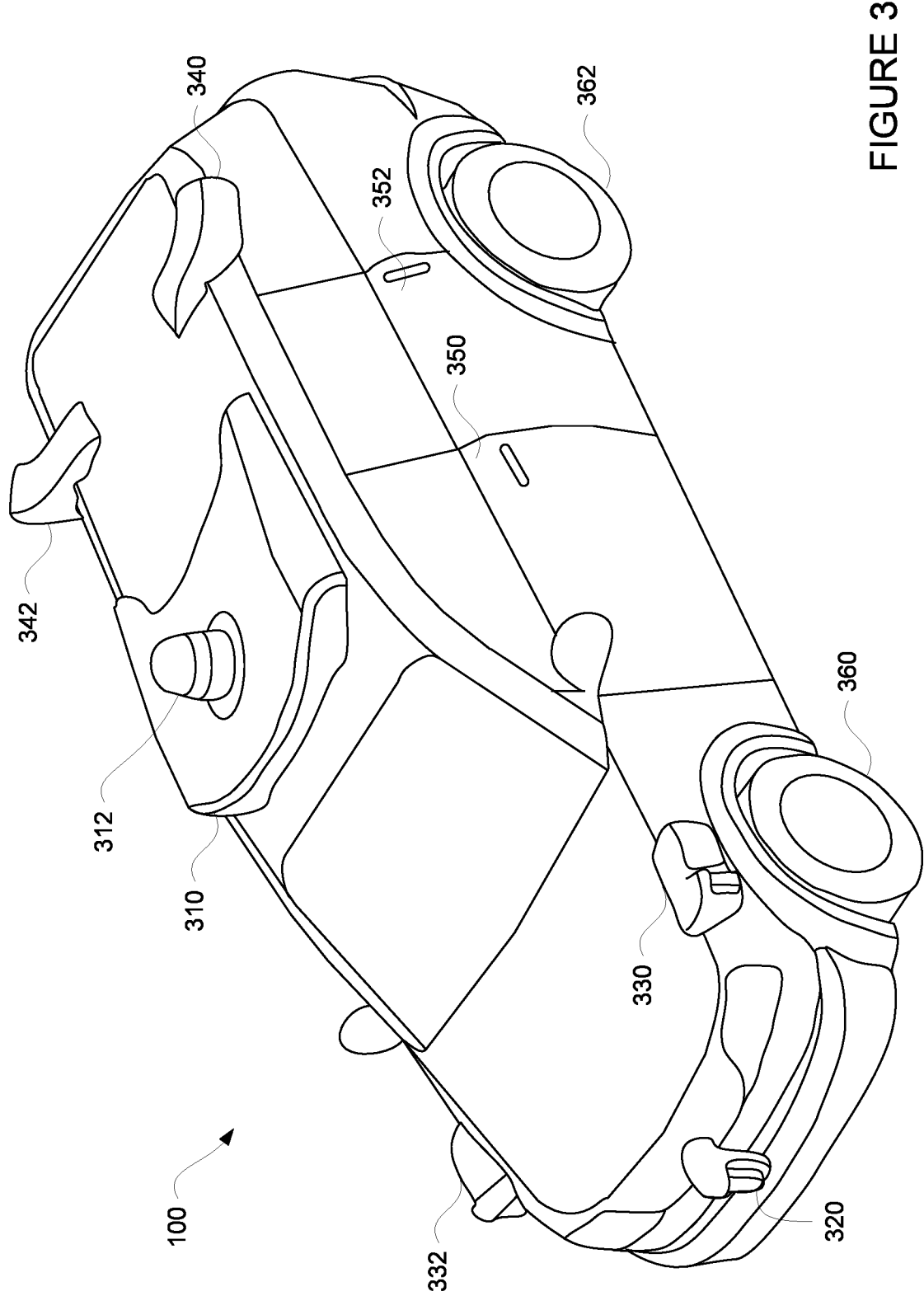
FIG. 3 is an example external view of a vehicle in accordance with aspects of the disclosure.

In the case where the vehicle is a passenger vehicle such as a minivan, the perception system 174 of the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

In order to address situations in which objects appear to vanish, a vanished object manager system 180 may track objects that appear to have vanished by propagating their most likely location based on the most recent available characteristics. The vanished object manager system may be an independent system or may be incorporated into either the perception or the planner systems. Aspects and functions of this system are discussed further below.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, classification (type), heading, orientation, speed, acceleration, change in acceleration, size, shape, etc. In some instances, characteristics may be input into a behavior prediction system software module which uses various models based on classification (type) to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination for the vehicle as well as feedback from various other systems of the vehicle (including a route generated by the routing system 170) may be input into a planning system software module of the planning system 168. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
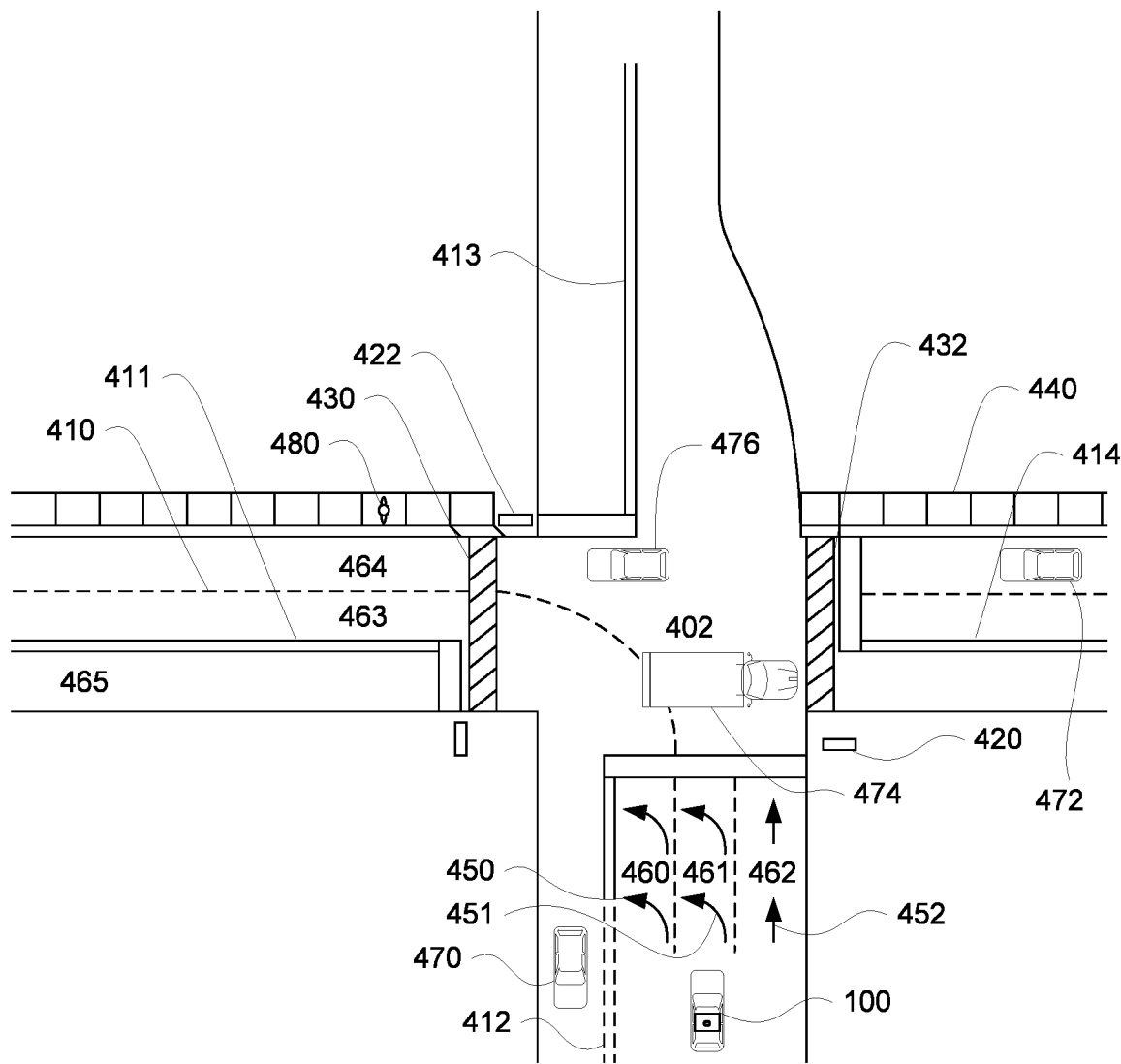
FIG. 4 is an example view of a section of roadway corresponding to the map information of FIG. 2 in accordance with aspects of the disclosure.

FIG. 4 represents vehicle 100 at a first point in time and driving in a section of roadway 400 corresponding to the map information 200. Roadway 400 includes information identifying the shape, location, and other characteristics of various features including intersection 402 corresponding to intersection 202, lane lines 410, 411, 412, 413, 414 corresponding to lane lines 210, 211, 212, 213, 214, traffic control devices 420, 422 corresponding to traffic control devices 220, 222, crosswalks 430, 432 corresponding to crosswalks 230, 232, sidewalk 440 corresponding to sidewalk 240, arrows 450, 451, 452 corresponding to arrows 250, 251, 252, as well as lanes 460, 461, 462, 463, 464, 465 corresponding to lanes 260, 261, 262, 263, 264, 265. In this example, vehicle 100 is approaching intersection 402 in lane 461. In addition, various other vehicles 470, 472, 474, 476 as well as pedestrian 480 are located at various points in and around intersection 402.

As noted above, the perception system 174 may publish sensor data generated by one or more sensors of the perception system. This sensor data may include information identifying characteristics of objects perceived by the perception system. For example, FIG. 4 represents vehicle 100 at a first point in time. At this first point in time, each of the vehicles 470, 472, 474, 476 as well as pedestrian 480 is within the field of view of the perception system 174 or rather, can be perceived by one or more sensors of the perception system 174. As such, the perception system 174 may publish characteristics for each of the vehicles 470, 472, 474, 476 and pedestrian 480, including, for example, the location, heading, speed, orientation, acceleration, change in acceleration, etc.

This sensor data and the characteristics may be received by the computing devices 110 as well as the various other systems of the vehicle. For instance, as noted above, this sensor data may be input into the behavior modeling system 176 in order to predict future behaviors of the objects. These future behaviors, the characteristics for each perceived object, as well as other information (such as the map information 200 and a route which the vehicle 100 is currently following) may also be input into the planning system 168 in order to determine a trajectory for the vehicle 100 to follow. The trajectory may then be used to control the vehicle in an autonomous driving mode.

Figure 5:
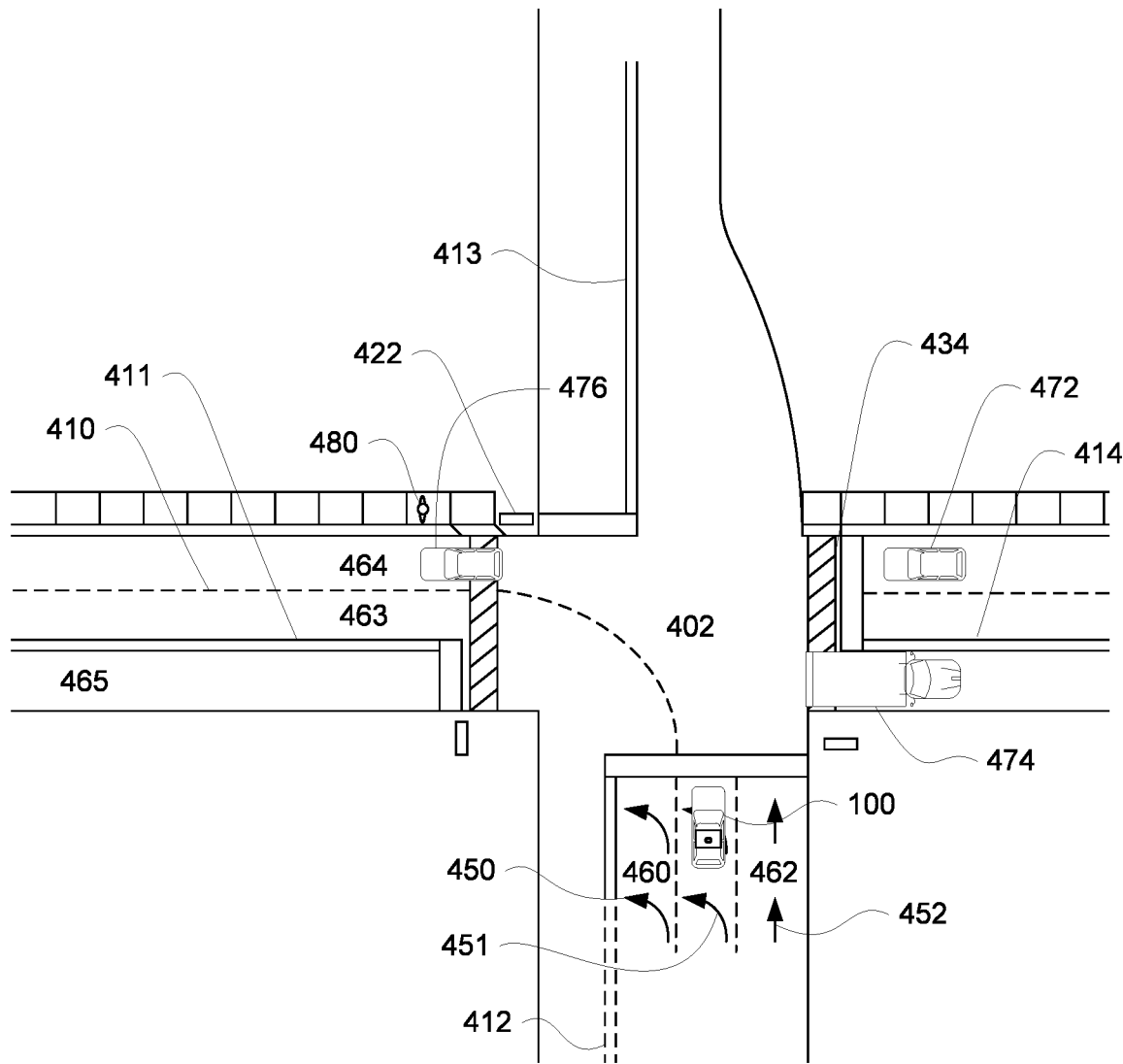
FIG. 5 is another example view of the section of roadway of FIG. 4 in accordance with aspects of the disclosure.
Figure 6:
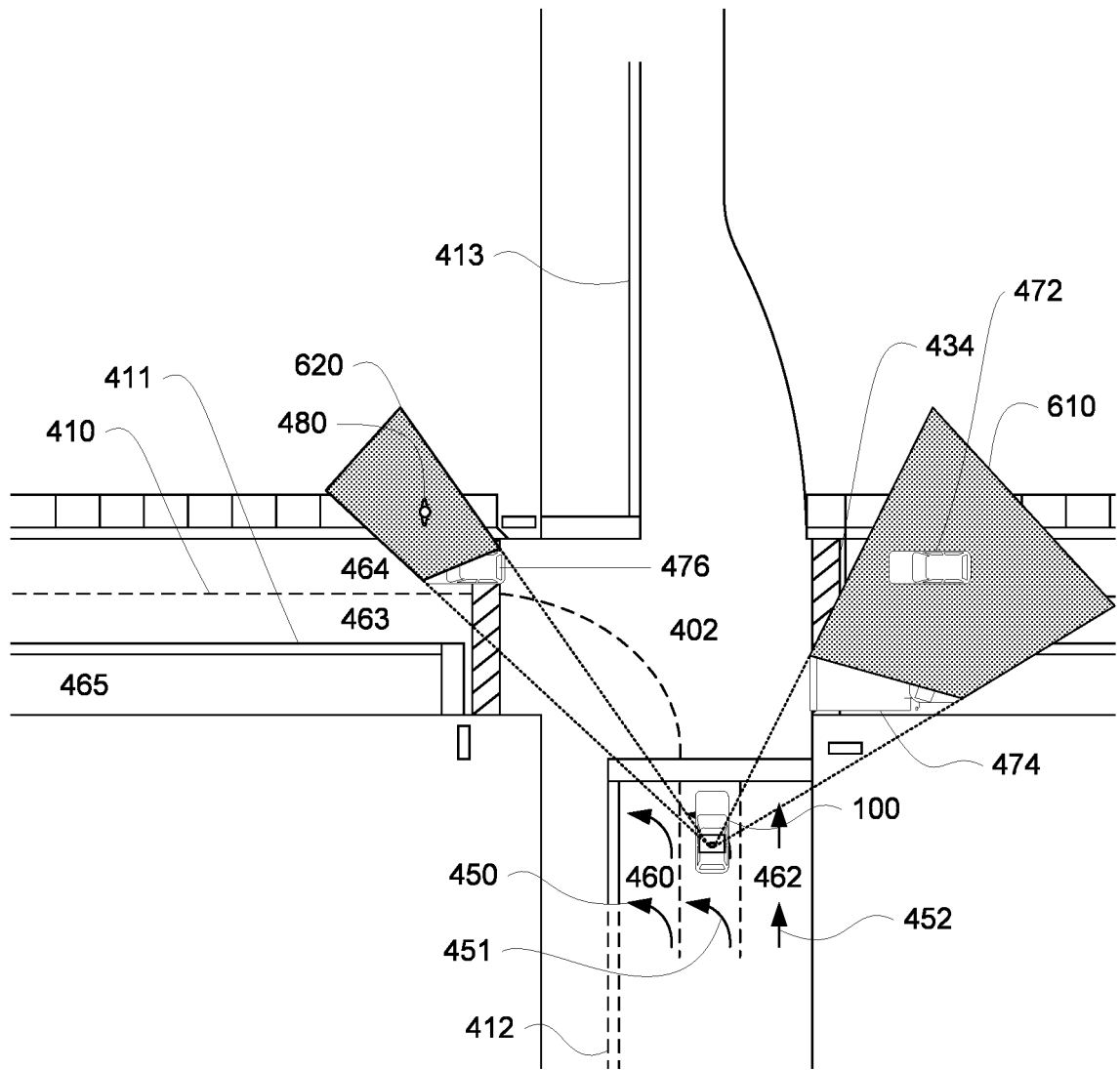
FIG. 6 is an example view of the section of roadway as depicted in FIG. 5 identifying occluded areas in accordance with aspects of the disclosure.

At certain points in time, some objects may appear to vanish. For instance, FIG. 5 represents vehicle 100 at a second point in time and stopped at intersection 402. In this example, the second point in time may occur a few seconds after the first point in time. As such, the positions of each of vehicles 470, 472, 474, 476 as well as pedestrian 480 have moved. At this second point in time, vehicle 470 is no longer depicted on the roadway 400 and as such, vehicle 470 may no longer be within the field of view of the perception system as vehicle 470. For example, vehicle 470 may be located beyond the range of the sensors of the perception system 174. In addition, turning to FIG. 6, the locations of vehicles 474 and 476 essentially cast "shadows" or create occluded areas 610, 620. In other words, because of the relative locations of vehicles 474 and 476 with respect to the field of view of the perception system 174, the perception system 174 is no longer able to perceive the vehicle 472 or the pedestrian 480 as these objects are located within occluded areas 610, 620. As such, each of vehicles 470, 472 and pedestrian 480 may appear to have vanished. As such, at the second point in time, the perception system 174 is no longer publishing sensor data for these objects.

In order to address such situations, the vanished object manager system 180 may track objects that appear to have vanished by propagating their most likely location based on the most recent available characteristics. In many cases, when an object vanishes, there may be no need for the vanished object manager system to track those objects, such as where the objects are not actually relevant for planning. This may occur, in some instances, when the autonomous vehicle 100 passes by a slow-moving vehicle or passes by a vehicle moving away from the autonomous vehicle (again, assuming these vehicles are not actually relevant for planning). Thus, tracking all objects that appear to have vanished may be an inefficient use of resources.

In order to avoid tracking too many objects, for identified objects in one of the aforementioned categories the vanished object manager system may determine whether the identified object meets a plurality of conditions. For instance, an example condition may include that only certain categories of objects may be remembered. In other words, the vanished object manager system 180 may use the characteristics published by the perception system 174 to determine whether an object is of a particular classification or type. For instance, only other road users such as pedestrians, bicyclists, and vehicles may be remembered by the vanished object manager system 180. In this regard, returning to FIGS. 4 and 5, each of vehicles 470, 472, 474, 476 and pedestrian 480 as road users would be of the classifications appropriate for being remembered. For example, if an object is perceived by the sensors of the perception system but it is not identified as a particular classification to a sufficient certainty, the object's classification may be designated as unknown. If that object is also moving, the object's classification may be designated as an unknown moving object.

Another example condition may include that the object has been perceived for at least a minimum amount of time or number of iterations. For example, the perception system may sometimes publish transient "false objects" that do not actually exist in the real world for a very brief time such as 1 or 2 iterations or some fraction of a second. Such objects should not be remembered as they never actually existed in the first place. Thus, in order to ensure that such objects are not remembered, an example condition may require an object be published during the minimum period of time, such as 0.1 second or more or less, or in each of the minimum number of iterations, such as 3 or more or less. This minimum number of iterations may be based on the classification of the object such that fewer iterations may be necessary for more vulnerable road users. For instance, the amount of time may be longer for vehicles and shorter for pedestrians.

Alternatively, the perception system may publish a set of false objects, or objects that were at one time detected and published, and thereafter found to be false objects. Objects may be included in this set, for instance, because such objects did not meet the minimum number of iterations described above. In this regard, another example condition may include that the object was not identified in the set of false objects.

Another example condition may be based on occlusion reasoning for the object. In other words, the object should not be expected to be visible inside the lidar sensor field-of-view. In this regard, the vanished object manager system may determine whether the object disappeared because the object exited a field of view of the perception system. For instance, the computing devices may determine whether the object's last observed location was close to an edge of that field of view. For example, the computing devices 110 may determine whether the object's last perceived location was within some distance of an edge of the field of view of the perception system 174. This distance may be determined based on the object's speed such that the distance decreases at the object's speed decreases, and increases as the object's speed increases. The field of view may depend both upon the range of the one or more sensors of the perception system as noted above as well as any objects within that range that may result in occluded areas (such as occluded areas 610, 620). For example, if an object within a few feet or more or less of an edge of the field of view, it may make more sense to remember the object, than if the object is in plain view and disappears. The former case may indicate that the object simply crossed an edge boundary of the field of view and went from being visible to not being visible to the perception system. In such situations, this may indicate that the object was more likely to have been a real object, and it may be more useful to track the object after it vanished. The latter case may indicate that the object was not actually a real object since it was not close to an edge of the field of view just before vanishing. In this regard, this example condition may require that the last perceived location (i.e. published location) of the object be close to or within a few feet or more or less from an edge of the field of view. In addition, this distance may be different for different types of objects or objects moving at different speeds. For example, a larger distance may be used for faster objects because they may be more likely to exit the field of view as compared to slower objects.

The aforementioned conditions may be used in any combination in order to determine which objects should be remembered by the vanished object manager system 180. Any objects that meet the plurality of conditions may be considered a vanished object and remembered by the vanished object manager system 180. For example, each of vehicles 470, 472 and pedestrian 480 may be identified as vanished objects which should be remembered by the vanished object manager system 180.

Figure 7:
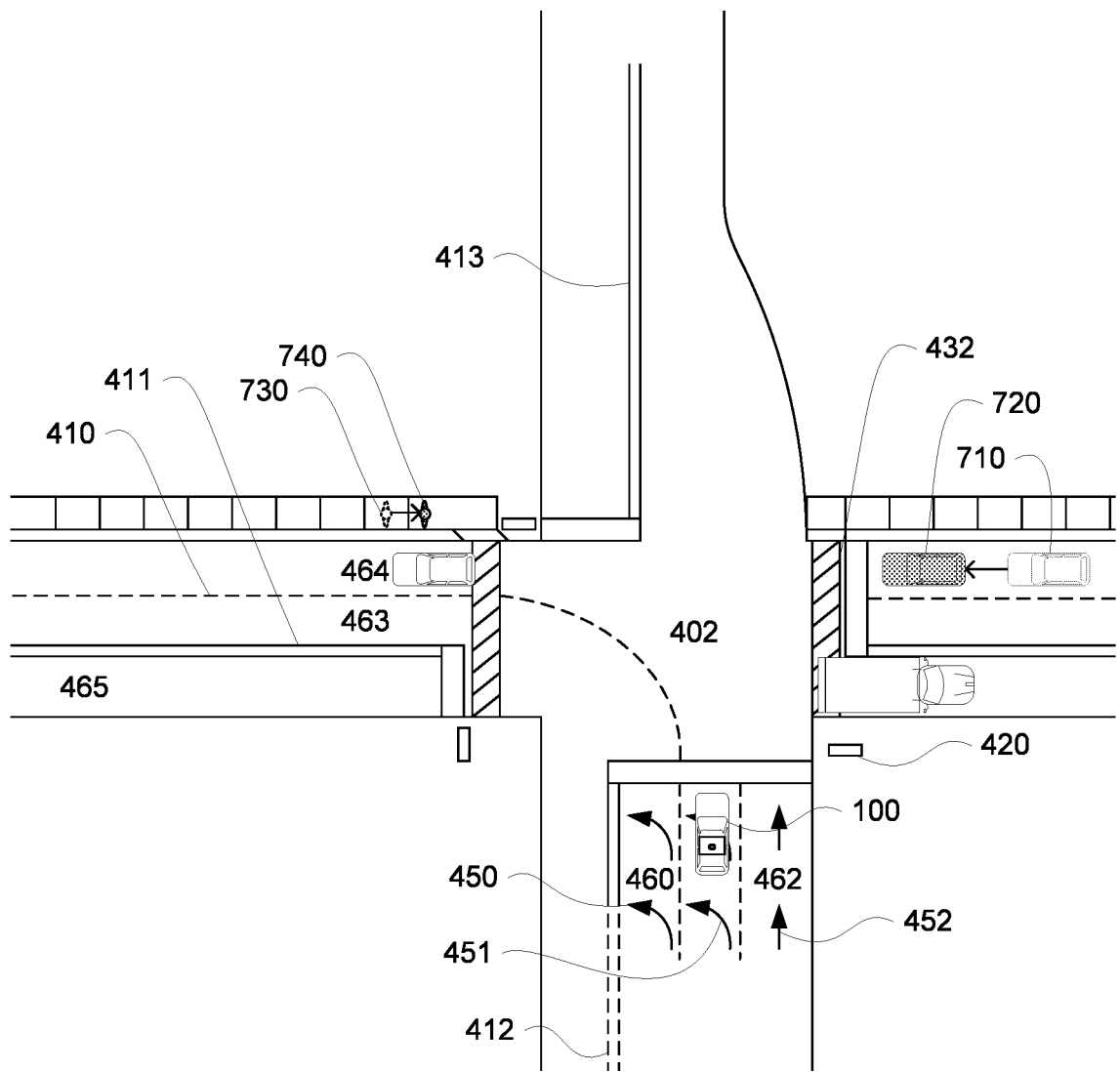
FIG. 7 is a further example view of the section of roadway of FIG. 4 in accordance with aspects of the disclosure.

The vanished object manager system may store vanished object data for objects including one or more of the last known characteristics of an object (e.g. latest characteristics published by the perception system 174 for the object), such as the object's last perceived location, as well as a most likely behavior prediction for the object. This most likely behavior prediction may be output from the behavior modeling system 176 based upon the last published characteristics for the object from the perception system. In this regard, the behavior modeling system 176 may output a single prediction or a plurality of predictions each with different likelihoods of occurring. Turning to FIG. 7, dashed-line vehicle 710 represents the location of vehicle 472 at the first point in time and shaded vehicle 720 represents the predicted location of vehicle 472 at the second point in time. Similarly, dashed-line pedestrian 730 represents the location of pedestrian 480 at the first point in time and shaded pedestrian 740 represents the predicted location of pedestrian 480 at the second point in time.

In some instances, once an object vanishes, that vanished object's expected predicted location and/or other of the predicted characteristics may be input back into the behavior modeling system 176 in order to provide a new or updated behavior prediction, for instance an updated prediction of the vanished object's characteristics at a given point in time. These updated predicted characteristics may also be stored by the vanished object manager system 180.

Each time the perception system 174 publishes new characteristics for perceived objects, the vanished object manager system 180 may use the vanished object data for any remembered objects to generate a set of predicted characteristics for the vanished objects. For instance, the vanished object manager system 180 may use the stored most likely behavior prediction for the object to identify or determine a set of predicted characteristics for a current time.

These predicted characteristics may then be input into the planning system 168 (in conjunction with the other data identified above) in order to be used to generate trajectories. This may enable the vehicle 100 to respond to vanished objects, such as vehicle 472 and pedestrian 480, even where these objects are not perceived by the perception system. For example, the vehicle may yield to pedestrian 480 as well as vehicle 472.

In addition, in some cases, the vanished objects may be associated with a higher level of uncertainty than perceived objects detected by the vehicle's sensors. Over time, this uncertainty may also increase. As such, the planner system may cause the vehicle to react differently to remembered objects than with perceived objects because there is some uncertainty around the existence or position of the remembered objects. As an example, if the vehicle is highly uncertain about where a remembered object might go, the vehicle may actually drive more cautiously.

Eventually, it may no longer be necessary or practical to remember certain vanished objects. In this regard, at some point in time, the vanished object data may no longer be stored or used to send predicted characteristics to the planner system. This may be the case when one or more conditions are met. One example condition may be if the object has not been perceived for more than a threshold period of time, such as 3 seconds or more or less. This may be the case for vehicles such as vehicle 470 which simply "drive away" from vehicle 100 are not likely to reappear. As another example condition, if a predetermined period of time, such as 0.7 seconds or more or less, has passed during which the objects predicted location indicates that the object should be visible within the field of view of the perception system 174 or not occluded. As another example condition, if the object's predicted location is within a predetermined distance to a newly perceived object of a matching category. This predetermined distance may depend upon the classification and how fast the newly perceived object is moving. For instance, near may be 3 to 5 meters or more or less or a vehicle (3 meters for a slower moving vehicle and 5 meters for a faster moving vehicle) and 1 meter or more or less for a pedestrian. As another example condition, if the predicted location of the object is overlapping with or is within the bounding box or contour of another object of the same or a different category. This may account for situations in which the perception system previously miscategorized the object.

In some instances, if there is a steerable sensor on the vehicle, the vanished object manager system may cause the perception system to steer the sensor towards the predicted location of a vanished object. This may allow the vehicle's perception system and/or the vanished object manager system to perceive the object and/or confirm the predicted location of the object. Of course, this may be dependent upon an assumption that the predicted location of the object is not occluded by another object.

Figure 8:
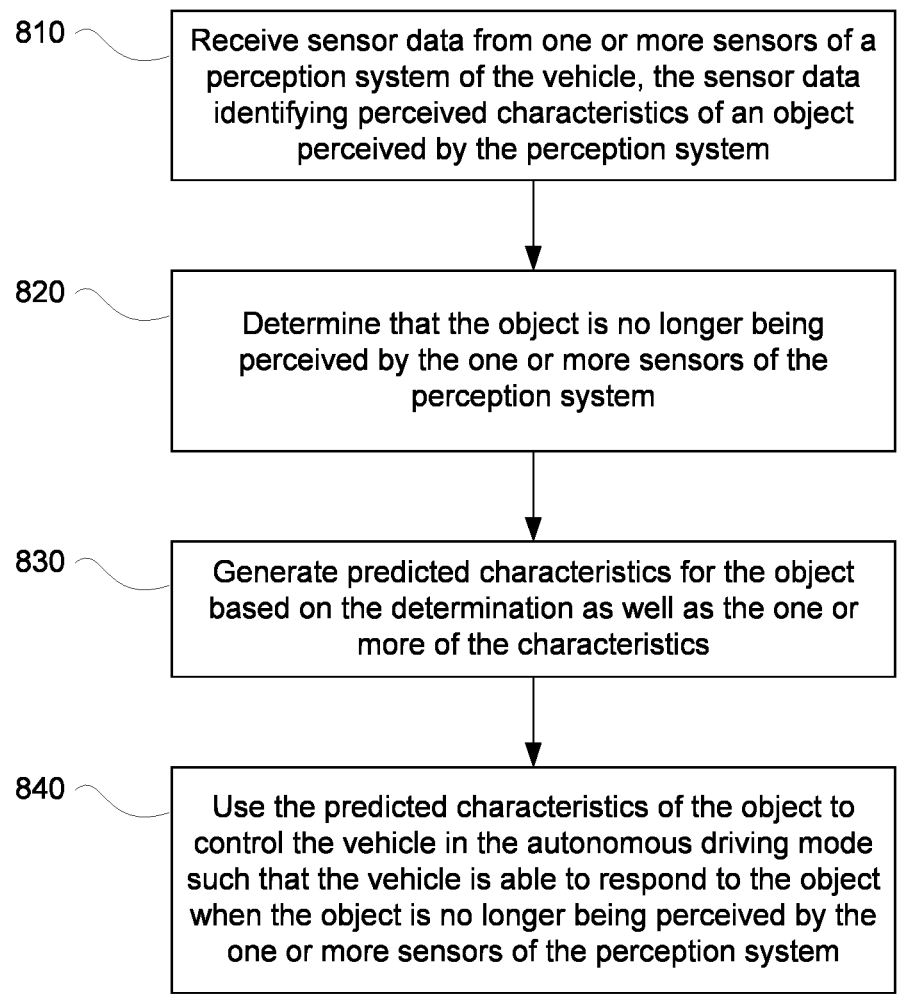
FIG. 8 is an example flow diagram in accordance with aspects of the disclosure.

FIG. 8 is an example flow diagram 800 of aspects of the technology described herein for controlling a vehicle, such as vehicle 100, having an autonomous driving mode, which may be performed by one or more processors of one or more computing devices of the vehicle, such as processors 120 of computing devices 110 or any other processors or computing devices of the various systems of vehicle 100. For instance, at block 810, sensor data is received from one or more sensors of a perception system of the vehicle, the sensor data identifying characteristics of an object perceived by the perception system. At block 820, that the object is no longer being perceived by the one or more sensors of the perception system is determined. As noted above, the plurality of conditions may include various other conditions. At block 830, predicted characteristics for the object are generated based on the determination as well as one or more of the characteristics. At block 840, the predicted characteristics of the object are used to control the vehicle in the autonomous driving mode such that the vehicle is able to respond to the object when the object is no longer being perceived by the one or more sensors of the perception system.

The features described herein may enable an autonomous vehicle to respond to real objects that may be nearby to the vehicle, but that the vehicle's perception system is not able to perceive. This may also increase safety of the vehicle. Moreover, by remembering only certain categories of objects which meet certain conditions, this may limit the amount of resources required for remembering, for instance if all observed objects which appeared to vanish were remembered.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a first vehicle having an autonomous driving mode, the method comprising:
    receiving, by one or more processors, sensor data from one or more sensors of a perception system of the first vehicle at a first point in time, the sensor data including information identifying characteristics of an object perceived within a field of view of the perception system;
    determining, by the one or more processors, the object's last observed location before a second point in time when the object is no longer being perceived within the field of view of the perception system;
    storing, by the one or more processors, object data including the object's last observed location and a behavior prediction for the object;
    at or after the second point in time, generating, by the one or more processors, a set of predicted characteristics of the object for a third point in time based on the stored object data;
    generating, by the one or more processors, a trajectory based on the set of predicted characteristics; and
    controlling, by the one or more processors, the first vehicle in the autonomous driving mode based on the trajectory such that the first vehicle is able to respond to the object.

2. The method of claim 1, wherein the object data is no longer stored after a threshold period of time without the object having been perceived.

3. The method of claim 1, further comprising:
    determining, by the one or more processors, whether the object is located within a predetermined distance of a newly perceived object.

4. The method of claim 1, wherein a prediction of a location of the object is based, at least in part, on a type of the object.

5. The method of claim 4, wherein the type of the object is a pedestrian, a bicyclist, or a second vehicle.

6. The method of claim 4, wherein the type of the object is a road user.

7. The method of claim 1, further comprising:
    determining, by the one or more processors, whether the object is within a predetermined distance of an edge of a field of view of the perception system based on the identified characteristics, and
    generating, by the one or more processors, predicted characteristics for the object when the object is determined to be within the predetermined distance of the edge of the field of view of the perception system based on the identified characteristics.

8. The method of claim 7, further comprising:
    determining, by the one or more processors, the field of view based on a range of the one or more sensors of the perception system.

9. A vehicle having an autonomous driving mode, the vehicle comprising:
    a perception system including one or more sensors; and
    one or more processors in communication with the perception system, the one or more processors being configured to:
        receive sensor data from the one or more sensors of the perception system at a first point in time, the sensor data including information identifying characteristics of an object perceived within a field of view of the perception system;
        determine the object's last observed location before a second point in time when the object is no longer being perceived within the field of view of the perception system;
        store object data including the object's last observed location and a behavior prediction for the object;

at or after the second point in time, generate a set of predicted characteristics of the object for a third point in time based on the stored object data;
generate a trajectory based on the set of predicted characteristics; and
control the vehicle in the autonomous driving mode based on the trajectory such that the vehicle is able to respond to the object.

10. The vehicle of claim 9, wherein the object data is no longer stored after a threshold period of time without the object having been perceived.

11. The vehicle of claim 9, wherein the one or more processors are further configured to determine whether the object is located within a predetermined distance of a newly perceived object.

12. The vehicle of claim 9, wherein the one or more processors are further configured to predict a location of the object based, at least in part, on a type of the object.

13. The vehicle of claim 12, wherein the type of the object is a pedestrian, a bicyclist, or a second vehicle.

14. The vehicle of claim 12, wherein the type of the object is a road user.

15. The vehicle of claim 9, wherein the one or more processors are further configured to:
determine whether the object is within a predetermined distance of an edge of a field of view of the perception system based on the identified characteristics, and
generate predicted characteristics for the object when the object is determined to be within the predetermined distance of the edge of the field of view of the perception system based on the identified characteristics.

16. The vehicle of claim 15, wherein the one or more processors are further configured to determine the field of view based on a range of the one or more sensors of the perception system.

17. A vehicle having an autonomous driving mode, the vehicle comprising:
a planning system configured to generate one or more trajectories;
a behavior modeling system configured to output one or more behavior predictions for an object;
a perception system including one or more sensors;
one or more processors in communication with the perception system, the one or more processors being configured to:
receive sensor data from the one or more sensors of the perception system at a first point in time, the sensor data including information identifying characteristics of the object perceived within a field of view of the perception system; and
determine the object's last observed location before a second point in time when the object is no longer being perceived within the field of view of the perception system; and
an object manager system configured to store object data including the object's last observed location and the one or more behavior predictions for the object provided by the behavior modeling system,
wherein the object manager system is further configured to generate, at or after the second point in time, a set of predicted characteristics of the object for a third point in time based on the stored object data, and input the set of predicted characteristics into the planning system, and
wherein the planning system generates the one or more trajectories based on the set of predicted characteristics, and the vehicle is controlled in the autonomous driving mode based on the one or more trajectories such that the vehicle is able to respond to the object.

18. The vehicle of claim 17, wherein the stored object data expires after a threshold period of time.

19. The vehicle of claim 17, wherein the one or more processors are further configured to determine whether the object is located within a predetermined distance of a newly perceived object.

20. The vehicle of claim 17, wherein the one or more processors are further configured to predict a location of the object based, at least in part, on a type of the object.

21. The vehicle of claim 20, wherein the type of the object is a pedestrian, a bicyclist, or a second vehicle.

* * * * *